United States Patent
Yun et al.

(10) Patent No.: US 11,551,012 B2
(45) Date of Patent: Jan. 10, 2023

(54) APPARATUS AND METHOD FOR PROVIDING PERSONAL ASSISTANT SERVICE BASED ON AUTOMATIC TRANSLATION

(71) Applicant: Electronics and Telecommunications Research Institute, Daejeon (KR)

(72) Inventors: Seung Yun, Daejeon (KR); Sang Hun Kim, Sejong-si (KR); Min Kyu Lee, Daejeon (KR); Yun Keun Lee, Daejeon (KR); Mu Yeol Choi, Daejeon (KR); Yeo Jeong Kim, Daejeon (KR); Sang Kyu Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 153 days.

(21) Appl. No.: 16/919,748

(22) Filed: Jul. 2, 2020

(65) Prior Publication Data

US 2021/0004542 A1    Jan. 7, 2021

(30) Foreign Application Priority Data

Jul. 5, 2019  (KR) .................. 10-2019-0081555
Jun. 30, 2020  (KR) .................. 10-2020-0080611

(51) Int. Cl.
*G06F 40/47* (2020.01)
*G10L 15/22* (2006.01)

(52) U.S. Cl.
CPC .............. *G06F 40/47* (2020.01); *G10L 15/22* (2013.01)

(58) Field of Classification Search
CPC ....... G06F 40/58; G10L 15/005; G10L 15/22; G10L 13/086; G10L 15/26
See application file for complete search history.

(56) References Cited

U.S. PATENT DOCUMENTS

| | | | |
|---|---|---|---|
| 10,789,959 B2* | 9/2020 | Kajarekar | ............... G10L 17/04 |
| 2013/0040615 A1 | 2/2013 | Sawhney | |
| 2014/0297284 A1 | 10/2014 | Gruber et al. | |
| 2018/0075023 A1 | 3/2018 | Kim et al. | |

(Continued)

FOREIGN PATENT DOCUMENTS

| | | |
|---|---|---|
| KR | 10-2013-0018105 | 2/2013 |
| KR | 10-2019-0006403 | 1/2019 |
| KR | 10-2019-0043329 | 4/2019 |

*Primary Examiner* — Mark Villena
(74) *Attorney, Agent, or Firm* — Kile Park Reed & Houtteman PLLC

(57) ABSTRACT

Provided are an apparatus and method for providing a personal assistant service based on automatic translation. The apparatus for providing a personal assistant service based on automatic translation includes an input section configured to receive a command of a user, a memory in which a program for providing a personal assistant service according to the command of the user is stored, and a processor configured to execute the program. The processor updates at least one of a speech recognition model, an automatic interpretation model, and an automatic translation model on the basis of an intention of the command of the user using a recognition result of the command of the user and provides the personal assistant service on the basis of an automatic translation call.

9 Claims, 4 Drawing Sheets

(56) References Cited

U.S. PATENT DOCUMENTS

| | | |
|---|---|---|
| 2019/0042565 A1 | 2/2019 | Choi et al. |
| 2019/0391827 A1* | 12/2019 | Simanovich .......... G06F 40/279 |
| 2020/0074993 A1* | 3/2020 | Lee ........................ G06F 3/048 |
| 2020/0194000 A1* | 6/2020 | Xian ....................... G06F 40/58 |
| 2020/0320984 A1* | 10/2020 | Kuczmarski ............ G06F 40/58 |

* cited by examiner

APPARATUS AND METHOD FOR PROVIDING PERSONAL ASSISTANT SERVICE BASED ON AUTOMATIC TRANSLATION

CROSS-REFERENCE TO RELATED APPLICATION

This application claims priority to and the benefit of Korean Patent Application Nos. 10-2019-0081555, filed on Jul. 5, 2019, and 10-2020-0080611, filed on Jun. 30, 2020 the disclosure of which is incorporated herein by reference in its entirety.

BACKGROUND

1. Field of the Invention

The present invention relates to an apparatus and method for providing a personal assistant service based on automatic translation.

2. Discussion of Related Art

A personal assistant service according to a related art merely recognizes a user's voice and provides a service corresponding to the voice.

Also, a speech recognition and automatic translation technology according to a related art provides an automatic service using only a basically trained model. Therefore, speech recognition of various user commands is difficult, and reliability of speech recognition and automatic translation of a conversation, which is carried out in a practical environment with a different language user, is degraded.

SUMMARY OF THE INVENTION

The present invention is directed to providing an apparatus and method for providing a personal assistant service capable of recognizing an intention of a user's command from a voice or text input of the user, updating a speech recognition model, an automatic interpretation model, and an automatic translation model, and carrying out the command of the user by calling a different language user.

According to an aspect of the present invention, there is provided an apparatus for providing a personal assistant service based on automatic translation, the apparatus including an input section configured to receive a command of a user, a memory in which a program for providing a personal assistant service according to the command of the user is stored, and a processor configured to execute the program. The processor updates at least one of a speech recognition model, an automatic interpretation model, and an automatic translation model on the basis of an intention of the command of the user using recognition results of the command of the user and provides the personal assistant service on the basis of an automatic translation call.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
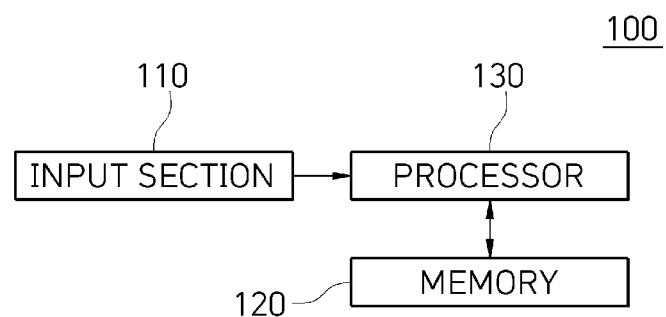
FIG. 1 is a block diagram of an apparatus for providing a personal assistant service based on automatic translation according to an exemplary embodiment of the present invention.

The above and other objects, advantages, and features of the present invention will become apparent to those of ordinary skill in the art by considering exemplary embodiments thereof described in detail with reference to the accompanying drawings.

However, the present invention is not limited to exemplary embodiments disclosed below and can be embodied in various different forms. The embodiments are provided to make the objects, configurations, and effects of the present invention readily known to those of ordinary skill in the art. The scope of the present invention is defined by the claims.

Terminology used in this specification is for the purpose of describing the embodiments and is not intended to limit the present invention. Unless the context clearly indicates otherwise, the singular forms include the plural forms as well. The terms "comprises" and/or "comprising" when used herein specify the presence of stated elements, steps, operations, and/or device and do not preclude the presence or addition of one or more other elements, steps, operations, and/or devices.

Hereinafter, the background of the present invention will be described first to aid in understanding of those of ordinary skill in the art, followed by exemplary embodiments of the present invention.

With the development of speech recognition technology and automatic translation technology, a personal assistant service and the like represented by artificial intelligence speakers and the like is being introduced.

According to a related art, a user's speech is recognized, and only a simple service is provided accordingly.

As an example of the simple service, when the user says "tell me the weather today," weather information is retrieved and provided to the user.

Recently, a service is being introduced which makes a call to an actual store or the like according to a command of a user and serves as an assistant of the user through a conversation without intervention of the user. This is merely a service which is performed in only one language, and thus communication in foreign languages is difficult.

When a personal assistant service is simply provided using a basically trained speech recognition model and an automatic interpretation model or an automatic translation model, speech recognition of various user commands is difficult, and speech recognition and automatic translation of a conversation, which is carried out in a practical environment with a different language user, are difficult.

The present invention is devised to solve the above-described problems and provides an apparatus and method for providing a personal assistant service based on automatic translation which are capable of updating a speech recognition model and an automatic interpretation model or an automatic translation model in a specialized manner on the basis of an intention of a user to substantially carry out a command of the user in a practical environment and capable of providing a personal assistant service by making a call to a person who uses a language other than a native language of the user through the updated models.

FIG. 1 is a block diagram of an apparatus for providing a personal assistant service based on automatic translation according to an exemplary embodiment of the present invention.

An apparatus 100 for providing a personal assistant service based on automatic translation according to the present invention includes an input section 110 for receiving a command of a user, a memory 120 for storing a program which provides a personal assistant service according to the command of the user, and a processor 130 for executing the program. The processor 130 updates at least one of a speech recognition model, an automatic interpretation model, and an automatic translation model on the basis of an intention of the command of the user using recognition results of the command of the user and provides the personal assistant service on the basis of an automatic translation call.

The processor 130 performs the command of the user through voice communication with a counterpart who uses a language other than a native language of the user, thereby providing the personal assistant service.

When the communication with the counterpart is finished, the processor 130 hangs up and reports command processing results to the user.

When the user command is input, the processor 130 runs a natural language understanding (NLU) module to analyze the user command.

The processor 130 acquires personalization-based information, information based on specialized online data, and information based on general online data and updates the speech recognition model, the automatic interpretation model, and the automatic translation model using the acquired information.

Figure 2:
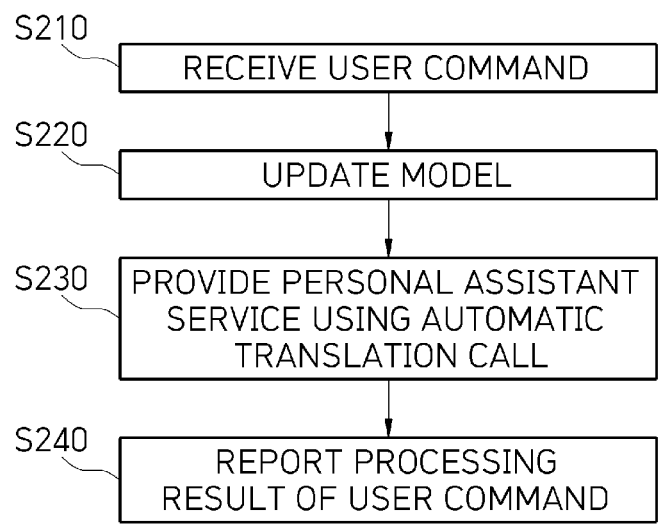
FIG. 2 is a flowchart illustrating a method of providing a personal assistant service based on automatic translation according to an exemplary embodiment of the present invention.

FIG. 2 is a flowchart illustrating a method of providing a personal assistant service based on automatic translation according to an exemplary embodiment of the present invention.

The method of providing a personal assistant service based on automatic translation according to the exemplary embodiment of the present invention includes an operation S210 of receiving an input user command, an operation S220 of performing a model update on the basis of the user command, an operation S230 of providing a personal assistant service using an automatic translation call, and an operation S240 of reporting processing results of the user command.

In the operation S230 after the model update of the operation S220, the processor 130 makes an automatic translation call and performs the command of the user through voice communication with a counterpart (who uses a language other than a native language of the user), thereby providing a personal assistant service.

In the operation S240, when the communication with the counterpart is finished, the processor 130 hangs up and reports command processing results to the user.

Figure 3:
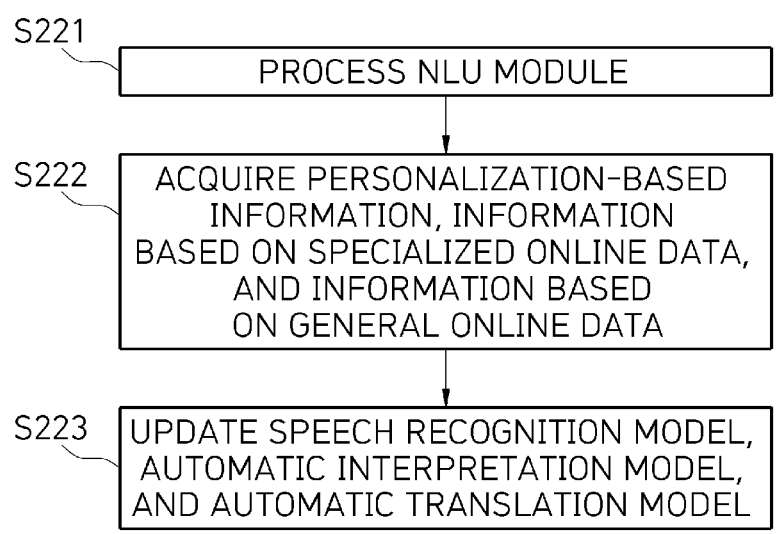
FIG. 3 is a flowchart illustrating a model update process according to the exemplary embodiment of the present invention.

FIG. 3 is a flowchart illustrating a model update process according to the exemplary embodiment of the present invention.

The model update process according to the exemplary embodiment of the present invention includes an operation S221 of processing an NLU model, an operation S222 of acquiring information based on personalization-based information, specialized online data, and information based on general online data, and an operation S223 of updating a speech recognition model, an automatic interpretation model, and an automatic translation model.

The user gives a command to a personal assistant application installed on a terminal through a voice input, a text input, or the like.

The processor 130 runs an NLU module in the speech recognition model and the automatic interpretation model or the automatic translation model to analyze the user command, thereby acquiring related information (S221 and S222).

Subsequently, the processor 130 updates the speech recognition model and the automatic interpretation model or the automatic translation model using the related information acquired through user command analysis (S223).

When the speech recognition model is a neural network-based model, the speech recognition model is trained with a speech signal and text corresponding thereto together to learn the corresponding information.

When the speech recognition model is a speech recognition model, which is a traditional model, rather than a neural network-based model, the speech recognition model may be a language model or the like including a pronunciation dictionary.

The automatic interpretation model is based on a neural network or statistics which contain information learned from a bilingual corpus between a source language and a target language and the like.

The automatic translation model is a model trained with source language speeches and counterpart language text corresponding thereto which are integrated in an end-to-end manner.

Automatic translation is performing an estimation operation for performing speech recognition, automatic interpretation, automatic translation, etc. on the basis of a trained speech recognition model and a trained automatic interpretation model or an automatic translation obtained by integrating the two models.

The speech recognition model cannot correctly recognize words which have not been learned in a training process and exhibits low speech recognition performance with regard to sentences and the like which have not been learned.

Like speech recognition, automatic interpretation also has a problem in that it is difficult to interpret unregistered words and the like and interpretation performance is degraded with regard to words and expressions which have not appeared in a training corpus a sufficient number of times.

The end-to-end automatic translation model develops these problems more often due to lack of training data.

However, to serve as a personal assistant in a foreign language under a practical situation, it is necessary to perform speech recognition and automatic interpretation with regard to proper nouns such as food names, product names, shop names, place names, and persons' names. Therefore, it is necessary to update the speech recognition model and the automatic interpretation model or the automatic translation model depending on a model adopted by an automatic translator.

An update module for the speech recognition model, the automatic interpretation model, and the automatic translation model according to the exemplary embodiment of the present invention performs such a function and determines whether the command of the user is based on speech recognition or a text input.

When it is determined that the command is a text input command, the text input is transferred to the NLU module without any change. When the command is a speech recognition command, the speech recognition result is transferred to the NLU module. Then, NLU module processing is performed.

The speech recognition model and the automatic interpretation model or the automatic translation model is updated through three information acquisition operations on the basis of processing results of the NLU module.

An operation of acquiring personalization-based information and updating a model will be described below.

When a terminal which makes a call is a smart terminal, related information is acquired from an address book, notes, a search history, etc. in the terminal.

As an example, a case in which the user gives the personal assistant a command such as "make a reservation for an engine oil change at car service station A tomorrow afternoon" will be described.

In this case, the NLU module may analyze information required for the reservation and then determine that what to do is "reservation for an engine oil change," a subject is "the user," a target is "car service station A," the time is "tomorrow afternoon," and the like.

Then, the license plate number, the car model, the phone number, etc. which are useful in performing such communication are acquired through personalization-based information in the terminal.

After acquiring the information, when an automatic interpretation support server for providing one-to-one translation data is in operation to allow use of an artificial intelligence assistant in multiple languages, the acquired information is interpreted through the automatic interpretation support server. On the other hand, when no automatic interpretation support server is in operation or there is no one-to-one translation for the acquired information, one-to-one translation data for a source language and a target language is acquired using an one-to-one translation dictionary searcher or an automatic interpreter.

Numbers and proper nouns may be acquired through rules for reading numbers, ranges of proper nouns, and the like.

The speech recognition model and the automatic interpretation model or the automatic translation model is updated with the acquired data.

To aid in understanding of those of ordinary skill in the art, it is assumed that a conversation described in one language as shown in Table 1 below is made in different languages.

TABLE 1

Source language (the artificial intelligence assistant): "Hello. I want to make a reservation for an engine oil change tomorrow afternoon."
Target language (an operator of a car service station): "Okay, tell me your name."
Source language (the artificial intelligence assistant): "My name is Hong Gildong."
Target language (an operator of a car service station):
"License plate number, please."
Source language (the artificial intelligence assistant): "It's XXXX."
Target language (an operator of a car service station):
"You have been to this car service station. Your car model comes out to be YYYY, is this correct?"
Source language (the artificial intelligence assistant): "Yes, it is."
Target language (an operator of a car service station):
"Is 2 pm okay for your reservation?"
Source language (the artificial intelligence assistant): "Yes, please"
Target language (an operator of a car service station):
"Your phone number is OOO-OOO-OOOO, right?"
Source language (the artificial intelligence assistant): "Yes, it's TABLE 1-continued the same as it was when I visited there before."
Target language (an operator of a car service station):
"Thank you. See you tomorrow."

When automatic translation is performed without a model update, speech recognition or automatic interpretation may be difficult with regard to the name, car model, license plate number, phone number, and the like. However, according to the exemplary embodiment of the present invention, the name, car model, license plate number, phone number, etc. are reflected on the model so that automatic translation may be smoothly performed.

An operation of acquiring information based on specialized online data and updating a model will be described below.

When car service station A provides information on products and services provided by the car service station and information on the station address and the like in target language text through a website, a social network service (SNS), or the like, the information is collected and structured into a database (DB).

When the car service station does not provide the information in target language text, the information is acquired in source language text. In this case, the information is interpreted using the automatic interpretation support server, the one-to-one translation dictionary, the automatic translator, etc. to acquire a DB.

The automatic interpretation model and a target language speech recognition model or the automatic translation model is updated using the acquired DB.

In the case of proper nouns, a one-to-one translation DB may be acquired from ranges of the proper nouns.

When the car service station does not provide online information but an introduction webpage, an SNS, or the like is in operation, related one-to-one translation data may be acquired through such a route, and the model may be updated with the acquired data.

Table 2 is an example of a conversation according to the above-described embodiment.

TABLE 2

Target language (an operator of a car service station): "We can only change your engine oil to YYY engine oil. Is that okay with you?"
Source language (the artificial intelligence assistant):
"Yes, it's okay."
Target language (an operator of a car service station):
"Okay. An oil change with YYY engine oil is OOOO won."

According to the exemplary embodiment of the present invention, information based on specialized online data is acquired to update the model in advance. Therefore, a product name, a price, etc. of which speech recognition and interpretation are difficult may be reflected on the model in advance, and thus smooth automatic translation can be performed.

An operation of acquiring information based on general online data and updating a model will be described below.

According to the exemplary embodiment of the present invention, after general keywords related to an intention of the user and words, such as "engine oil change" or "YYY engine oil," are interpreted into the target language, a web search is performed in the target language using the interpreted words as input keywords, and the target language speech recognition model is updated using a DB obtained by structuring found text.

Also, one-to-one translation expressions for keywords and proper nouns, such as "engine oil change" or "YYY engine oil," are searched for, and when one-to-one translation sentence data is present, the automatic interpretation model is updated with the one-to-one translation sentence data (such information may be reflected during an update of the automatic translation model).

Since the model is updated with related general data and the like, speech recognition and automatic translation performance is improved.

When all data to be added is acquired, a model update is performed through the following operations.

When an automatic translation service is not completely integrated and is separated into a speech recognition model, an automatic interpretation model, and a speech synthesis model, the speech recognition model and the automatic interpretation model are updated as follows.

When the speech recognition model includes a speech recognition dictionary, a language model, and an acoustic model which are widely used at the present time, a word to be recognized may not be present in the speech recognition dictionary. In this case, the word is added to the speech recognition dictionary, and a high probability weight is given to the word in the language model.

Also, the language model is configured to give a high weight to a word n-gram of a sentence to be recognized, and then the speech recognition dictionary, the language model, and the acoustic model are integrated into a search network.

Since it may take some time to integrate the speech recognition dictionary, the language model, and the acoustic model into a search network, an empty slot is prepared in advance for a word or a sentence to be recognized in the search network when it is necessary to rapidly update the models.

Subsequently, when words or word strings (sentences) which are determined as a speech recognition candidate are acquired, the empty slot previously prepared in the network is filled with the words or the word strings (the sentences) so that a model update is rapidly performed.

When a recursive neural network (RNN)-based language model and the like is present, a neural network-based speech recognizer additionally learns a word and a word string (a sentence) to be recognized using an incremental learning technique or the like or explicitly adjusts a weight of the word in the corresponding language model, thereby increasing the probability of recognizing the word and the word string (the sentence).

When a language model is not present, a speech synthesizer or the like is used to convert the word and the word string (the sentence) into "speech-text" pair data.

When a speech of a corresponding data set is given, some layers of an existing neural network model are retrained, or transfer learning or incremental learning for additional learning is performed to improve speech recognition performance so that a word or a word string (a sentence) corresponding to a label may be estimated.

When the neural network has a structure in which a value of a hidden variable and the like may be explicitly corrected, the value of the hidden value and the like is corrected so that the speech recognition candidate words or word strings (the sentences) may be recognized well.

In the case of an automatic interpreter having a one-to-one translation dictionary, the one-to-one translation dictionary is updated.

When the automatic translator has a translation memory, the translation memory is updated so that translation may be performed with acquired one-to-one translation sentences and words at a front stage.

In the case of a statistics-based or neural network-based interpreter, high weights are directly given to data, or a frequency of additional data and the like is adjusted so that an acquired one-to-one translation dictionary and one-to-one translation sentences may have high weights. In this way, a statistic model, a neural network model, etc. are learned in addition to existing training data.

When a re-learning process takes too much time, a statistics model is additionally learned using a technique, such as incremental learning, so that data to be added may be rapidly reflected on a training model, or some layers of the neural network are retrained or a layer is added and trained so that the neural network model may model the corresponding data well.

When it is possible to directly correct a data value of the statistics model or a value of a hidden variable of the neural network, the automatic interpretation model may be updated by correcting a value related to corresponding data.

When source language speech recognition to target language speech synthesis are completely integrated into one neural network in the automatic translation model, the speech synthesizer is used to generate a speech from text data of the source language and the target language so that "source language speech-target language speech" data sets are generated.

The data sets are included in a basic training data set for relearning. Alternatively, when it is necessary to rapidly update the model, some layers of the neural network are retrained to additionally learn the data sets, or a layer is added to learn the data sets. In this way, transfer learning or incremental learning is performed to update the model.

When the automatic translation model is configured with a neural network model which performs source language speech recognition to target language interpretation rather than target language speech synthesis, the speech synthesizer is used to generate a speech from text data of only the source language in the acquired data sets, and "source language speech-target language speech" data sets are generated. The "source language speech-target language speech" data sets are included in a basic training data set for relearning. Alternatively, when it is necessary to rapidly update the model, some layers of the neural network are retrained to additionally learn the data sets, or a layer is added to update the model.

The above-described technique may be applied not only to the car maintenance-related example but also to various applicable fields such as restaurants, car rental services, and shopping.

In addition, information acquired in this way is reflected on the NLU model, a conversation processing module, etc. and used to improve performance of the modules.

Figure 4:
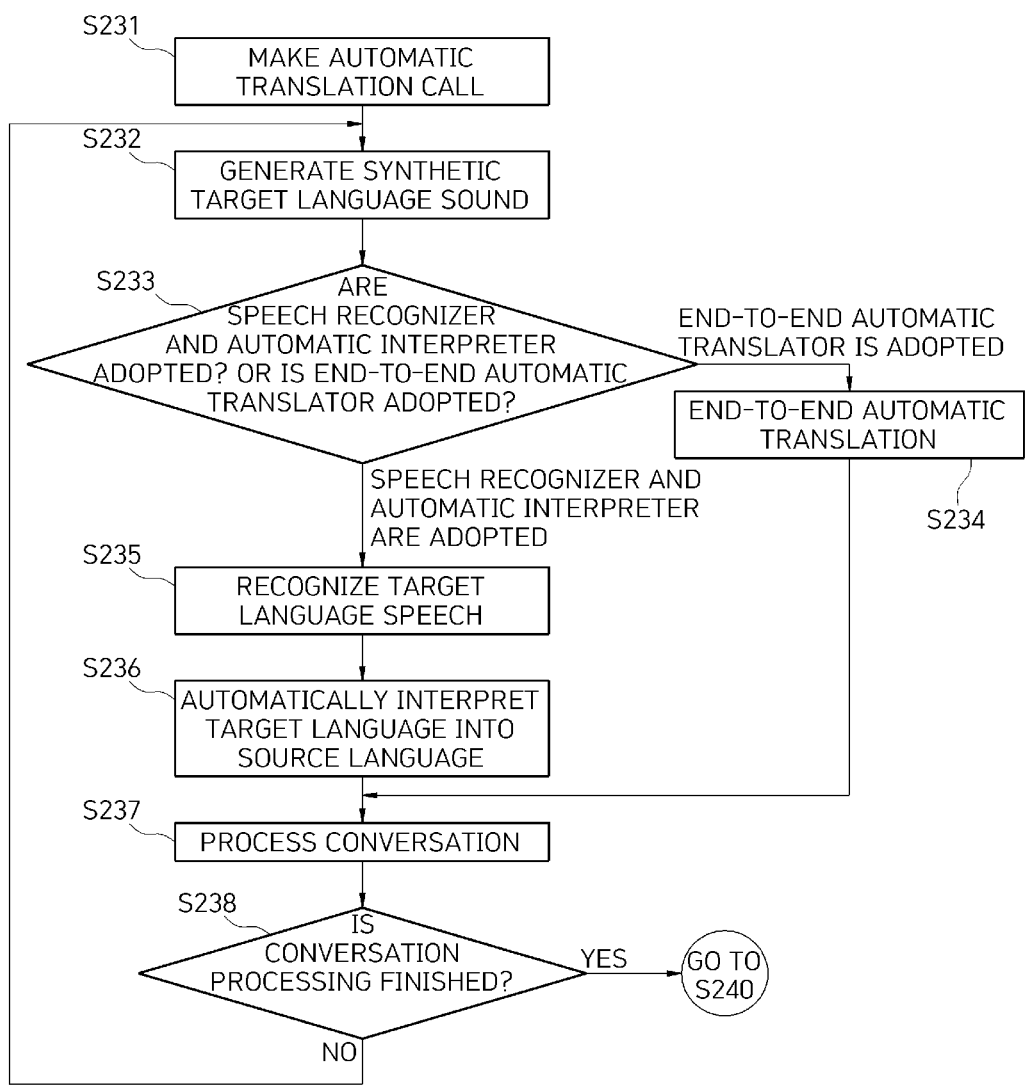
FIG. 4 is a flowchart illustrating a personal assistant service providing process according to the exemplary embodiment of the present invention.

FIG. 4 is a flowchart illustrating a personal assistant service providing process according to the exemplary embodiment of the present invention.

When an update of the speech recognition model, the automatic interpretation model, and the automatic translation model is finished, the personal assistant makes an automatic translation call to a corresponding business (S231).

When the business answers the phone, the conversation processing module relates the purpose of the call with a synthetic target language sound (S232).

In an operation S233, a model of the automatic translator is checked.

When it is checked in the operation S233 that a speech recognizer and an automatic interpreter are employed, a speech spoken in a corresponding language is recognized in an operation S235.

In an operation S236, the target language is automatically interpreted into a source language, and in an operation S237, the conversation is processed by the conversation processing module.

When it is checked in the operation S233 that an end-to-end translation model is employed, end-to-end automatic translation is performed in an operation S234, and results of the end-to-end automatic translation are transferred to the conversation processing module. Then, the conversation is processed in the operation S237.

In an operation S238, the conversation processing module determines whether the conversation is finished. When the conversation is not finished, the process returns to the operation S232. When the conversation is finished, command processing results are reported to the user in an operation S240.

According to the exemplary embodiments of the present invention, in order to perform a personal assistant function in a language other than a native language, a speech recognition model and an automatic interpretation model, or in some cases, an automatic translation model, is updated with information based on actual data (personalized information, specialized online information, and general online information). Consequently, it is possible to improve automatic translation performance and remarkably boost performance of a personal assistant based on automatic translation in a practical situation.

According to the exemplary embodiments of the present invention, when a user goes to a foreign country or a foreigner enters the user's own country, it is possible to make various reservations, orders, civil requests, etc. using the personal assistant without directly making a call to a counterpart in a foreign language.

Effects of the present invention are not limited to those mentioned above, and other effects which have not been mentioned will be clearly understood by those of ordinary skill in the art from the above detailed description.

Meanwhile, the method of providing a personal assistant service based on automatic translation according to the exemplary embodiment of the present invention can be implemented in a computer system or recorded in a recording medium. The computer system may include at least one processor, a memory, a user input device, a data communication bus, a user output device, and a storage. The aforementioned elements perform data communication through a data communication bus.

The computer system may further include a network interface coupled to a network. The processor may be a central processing unit (CPU) or a semiconductor device which processes instructions stored in the memory and/or the storage.

The memory and the storage may include various volatile or non-volatile storage media. For example, the memory may include a read only memory (ROM) and a random access memory (RAM).

Therefore, the method of providing a personal assistant service based on automatic translation according to the exemplary embodiment of the present invention can be implemented as a computer-executable method. When the method of providing a personal assistant service based on automatic translation according to the exemplary embodiment of the present invention is performed in a computing device, computer-readable instructions may perform the method of providing a personal assistant service according to the present invention.

Meanwhile, the above-described method of providing a personal assistant service based on automatic translation according to the present invention can be implemented as computer-readable code on a computer-readable recording medium. The computer-readable recording medium is any type of recording medium which stores data that can be read by a computer system. For example, the computer-readable recording medium may be a ROM, a RAM, a magnetic tape, a magnetic disk, a flash memory, an optical data storage device, or the like. Also, the computer-readable recording medium may be distributed among computer systems connected via a communication network and stored in the form of code that can be read and executed in a de-centralized manner.

The present invention has been described above with reference to the exemplary embodiments. However, it will be understood by those of ordinary skill in the art that various modifications can be made without departing from the scope of the present invention. Consequently, the exemplary embodiments set forth herein should be considered in a descriptive sense and not in a limiting sense. The scope of the present invention is defined not by the detailed description but by the claims, and all differences within the equivalents should be construed as being included in the present invention.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

What is claimed is:

1. An apparatus for providing a personal assistant service based on automatic translation, the apparatus comprising:
   an input section configured to receive a command of a user;
   a memory in which a program for providing a personal assistant service according to the command of the user is stored; and
   a processor configured to execute the program,
   wherein the processor updates at least one of a speech recognition model, an automatic interpretation model, and an automatic translation model on the basis of an intention of the command of the user using a recognition result of the command of the user and provides the personal assistant service on the basis of an automatic translation call,
   wherein the processor acquires the personalization-based information using at least one of an address book, a note, and a search history in a smart terminal,
   wherein the processor collects information on at least one of a product, a service, and an address through a website or a social network service (SNS) and structures the collected information into a database (DB) to acquire the information based on specialized online data,
   wherein the processor acquires personalization-based information, information based on specialized online data, and information based on general online data and updates at least one of the speech recognition model, the automatic interpretation model, and the automatic translation model with the acquired information, and
   wherein the processor prepares an empty slot in a search network and updates the at least one of the models by filling the empty slot with a corresponding word or sentence when information determined as a speech recognition candidate is acquired.

2. The apparatus of claim 1, wherein the processor executes a natural language understanding (NLU) module according to the command of the user to analyze the command of the user.

3. The apparatus of claim 2, wherein the processor determines whether the command of the user is a command based on speech recognition or a command of a text input, transfers the command to the NLU module without any change when the command of the user is the command of the text input, and transfers a speech recognition result to the NLU module when the command of the user is the command based on the speech recognition.

4. The apparatus of claim 1, wherein, when an automatic interpretation support server is in operation, the processor acquires one-to-one translation data from the automatic interpretation support server, and
   when the automatic interpretation support server is not in operation, the processor acquires translation data with regard to a source language and a target language by utilizing a one-to-one translation dictionary search or an automatic interpreter.

5. The apparatus of claim 1, wherein, when the information based on the specialized online data is not provided in target language text, the processor acquires the information in source language text and acquires the information in target language text using an automatic interpretation support server, a translation dictionary, and an automatic interpreter.

6. The apparatus of claim 1, wherein the processor interprets a keyword related to the intention of the user into a target language and performs a web search in the target language using the interpreted keyword as an input keyword to structure found text into a database.

7. A method of providing a personal assistant service based on automatic translation, the method comprising:
   (a) receiving a command of a user;
   (b) updating at least one of a speech recognition model, an automatic interpretation model, and an automatic translation model on the basis of an intention of the command of the user using a recognition result of the command of the user; and
   (c) providing a personal assistant service using an automatic translation call,
   wherein the operation (b) comprises:
   acquiring the personalization-based information using at least one of an address book, a note, and a search history in a smart terminal;
   acquiring the information based on specialized online data by collecting information on at least one of a product, a service, and an address through a website or a social network service (SNS) to structure the collected information into a database;
   interpreting a keyword related to the intention of the user into a target language and performing a web search in the target language using the interpreted keyword as an input keyword to structure found text into a database;
   updating at least one of the speech recognition model, the automatic interpretation model, and the automatic translation model using personalization-based information, information based on specialized online data, and information based on general online data;
   preparing an empty slot in advance for a word or a sentence to be recognized in a search network; and
   updating the at least one of the models by filling the empty slot with a corresponding word or sentence when information determined as a speech recognition candidate is acquired.

8. The method of claim 7, wherein, when a command of a text input is received as the command of the user in the operation (a), the operation (b) comprises transferring the command to a natural language understanding (NLU) module without any change, and
   when a command based on speech recognition is received as the command of the user, the operation (b) comprises transferring a speech recognition result to the NLU module.

9. The method of claim 7, wherein the operation (b) further comprises acquiring translation data using an automatic interpretation support server, a translation dictionary searcher, and an automatic interpreter.

* * * * *